A. LUECKEL,

Assignor to S. HILDESHEIMER & Co.

PICTURE EXHIBITOR.

No. 10,178. Reissued Aug. 8, 1882.

WITNESSES:

Francis McArdle

C. Sedgwick

INVENTOR:

A. Lueckel

BY Munn & Co.

ATTORNEYS.

N. PETERS, Photo-Lithographer, Washington, D. C.

UNITED STATES PATENT OFFICE.

AUGUST LUECKEL, OF BROOKLYN, ASSIGNOR TO S. HILDESHEIMER & CO., OF NEW YORK, N. Y.

PICTURE-EXHIBITOR.

SPECIFICATION forming part of Reissued Letters Patent No. 10,178, dated August 8, 1882.

Original No. 253,730, dated February 14, 1882. Application for reissue filed April 18, 1882.

*To all whom it may concern:*

Be it known that I, AUGUST LUECKEL, of Brooklyn, in the county of Kings and State of New York, have invented a new and useful Improvement in Picture-Exhibitors, of which the following is a full, clear, and exact description.

My invention relates to ornamented cards generally termed "Christmas" and "birthday" cards, and has the object to obtain a greater variety and more ornametal effect than are furnished by the cards as usually made.

The invention consists in the combination, with a supporting-frame or easel, of a card having a bordering of ruffled material and folding leaf portions, as hereinafter described and claimed.

Reference is to be had to the accompanying drawings, forming part of this specification, in which similar letters of reference indicate corresponding part in all the figures.

Figure 1:
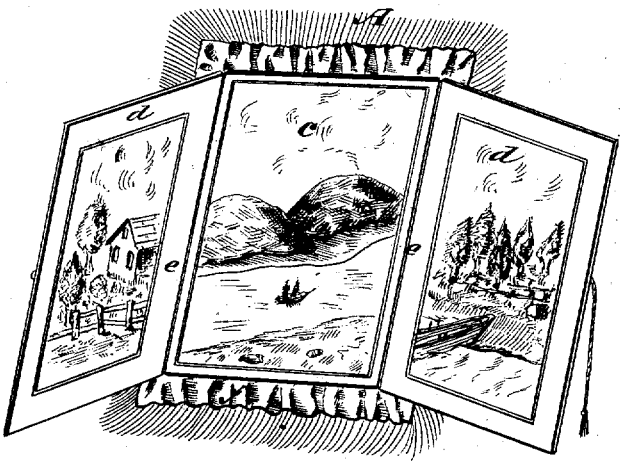
Figure 3:
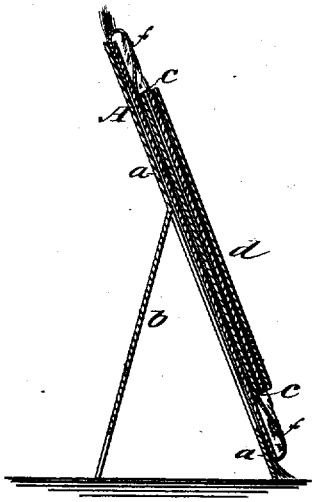
Figure 2:
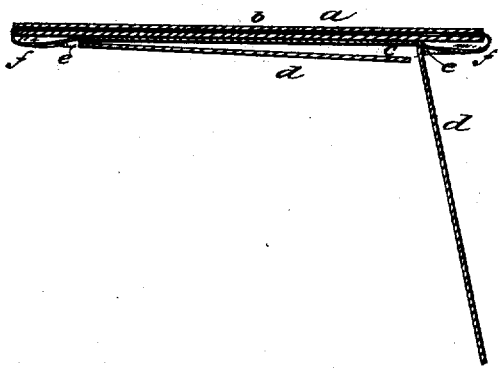

Figure 1 is a perspective view of my folding card in an open position. Fig. 2 is a horizontal section of the same in a partially-folded position, and Fig. 3 is a vertical section of the card as folded.

A is the supporting-frame or easel, consisting of a sheet, *a*, of card-board, having a portion cut out to form a supporting-leg, *b*, by which the frame is held at a proper inclination.

The card consists of a main portion, *c*, that is attached to the card-board *a*, and of the folding leaf portions *d d*, that are attached by a flexible connection, *e*, to the main portion, so that they can be folded down upon the main portion *c* or opened out, as illustrated in Fig. 1.

On the face of the card *c* a picture or other ornamental design is printed, and both sides of the hinged portions *d* are similarly ornamented, so that five separate pictures or ornamented surfaces are given. Around the edges of the card *c* is a bordering, *f*, of ruffled or plain material, and fringe is added as a finish.

The cards mounted and arranged in this manner are highly ornamental, and are displayed to the best advantage by the supporting-frame. The folding portions may be differently arranged. For instance, they may be attached to fold up or down, instead of sidewise, and a single leaf used in place of two.

I am aware it is not new to make a case with leaves hinged to a central stem for the display of photographic cards, or one with a hinged back, folding side, top, and bottom, as well as with flaps, like those of a letter, closing over the picture; but,

Having thus fully described my invention, I claim as new and desire to secure by Letters Patent—

1. The combination, with the frame A, consisting of the sheet *a* and leg *b*, of the card *c*, attached to the face of sheet *a*, and the leaves *d*, folding at the side edges, *e*, upon the card *c*, as shown and described.

2. The combination, with the frame A, consisting of sheet *a* and leg *b*, of the bordering *f*, consisting of ruffled and fringed woven fabric, as shown and described.

AUGUST LUECKEL.

Witnesses:
C. SEDGWICK,
D. M. HOLDREDGE.